Patented July 16, 1940

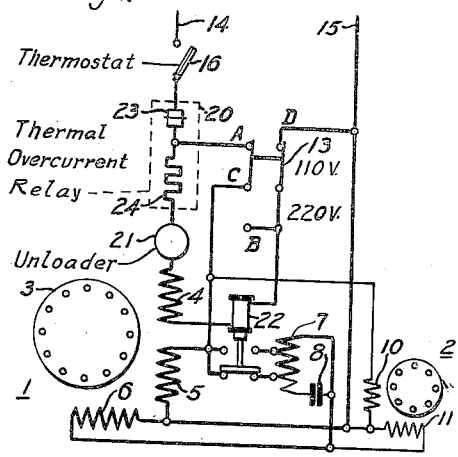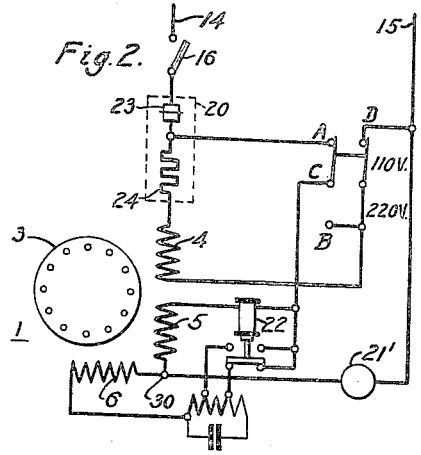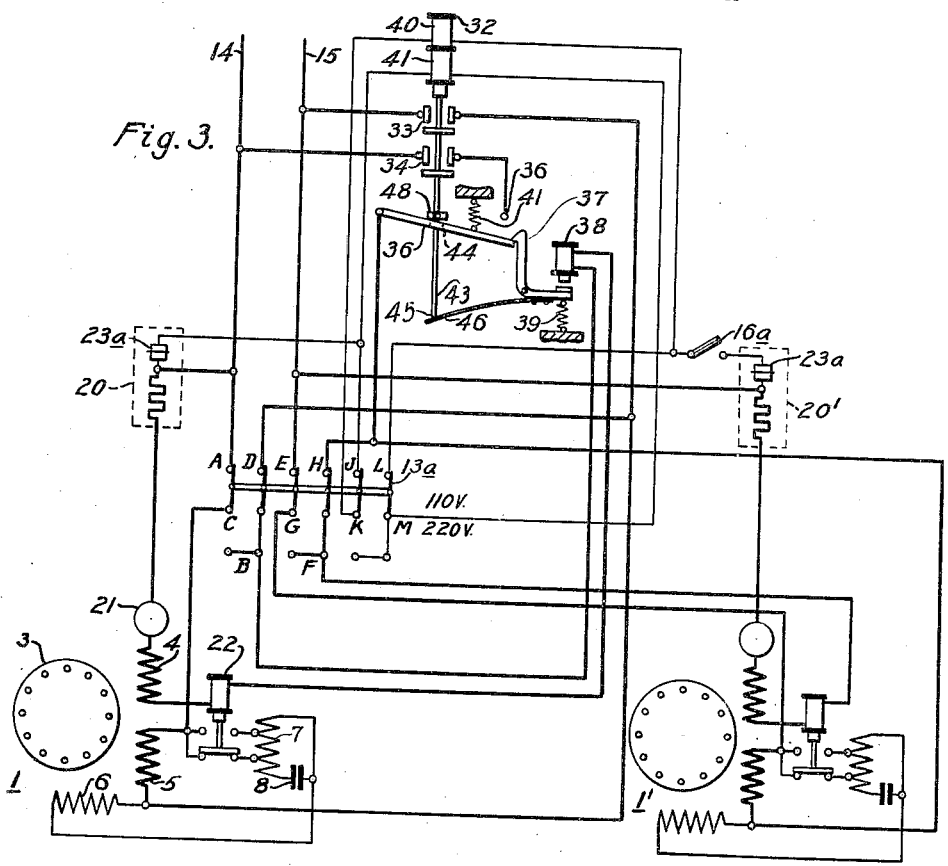

2,208,395

UNITED STATES PATENT OFFICE 2,208,395

DUAL-VOLTAGE APPARATUS

Eugene W. Scott, East Springfield, and Robert H. Tull, Springfield, Mass., assignors to Westinghouse Electric & Manufacturing Company, East Pittsburgh, Pa., a corporation of Pennsylvania Application February 26, 1938, Serial No. 192,764

4 Claims. (Cl. 172—239)

Our invention relates to dual-voltage electric apparatus, and it has particular relation to dual-voltage refrigerating units.

It is an object of our invention to provide electric apparatus, and particularly an electric motor, having a plurality of main windings and an auxiliary circuit, and having terminal connections whereby the main windings may be connected in series for high-voltage operation and in parallel for low-voltage operation, and connections for energizing the auxiliary circuit in shunt across one of said main windings, whereby said main windings, in their series connection, operate as a voltage-divider for said auxiliary circuit. The auxiliary circuit may be either a starting-winding circuit for the main motor, or it may be a smaller-size auxiliary motor. It will readily be seen that our invention makes it possible to utilize the same auxiliary circuit on either the high-voltage or the low-voltage circuit-connections of the main apparatus, thereby reducing the number of parts which must be manufactured and carried in stock, and reducing the cost of the aggregate.

A further object of our invention is to provide a dual-voltage electric apparatus, and particularly a dual-voltage electric motor, with a current-responsive device which responds approximately to the same speed or load of the motor or other apparatus, whether said motor or other apparatus is operating on its high-voltage connections or on its low-voltage connections. This object of our invention is accomplished by so energizing the current-responsive device that its current is not materially changed when the connections are changed from high-voltage to low-voltage or vice versa. Specifically, the current-responsive device is connected in series-circuit relation to one of a plurality of windings, which are connected in series for high-voltage operation and in parallel for low-voltage operation.

A more specific object of our invention is to provide a sequential starter-mechanism which is particularly adapted to control two motors of the above-mentioned type, so that the second motor is automatically started when the initial starting-current in-rush of the first motor has subsided.

With the foregoing and other objects in view, our invention consists in the circuits, apparatus, combinations and methods hereinafter described and claimed and illustrated in the accompanying drawing, wherein:

Figure 1 is a diagrammatic view of circuits and apparatus embodying our invention in a preferred form of embodiment, Fig. 2 is a similar view illustrating a slight variation in the connections of one of the current-responsive devices, and Fig. 3 is a similar view illustrating further modifications, including the utilization of two main motors, with sequential starting.

Our invention, as shown in Fig. 1, was particularly designed for a dual-voltage refrigerator unit, and particularly for a unit which had to be designed so that it would be provided with a set of terminal connections which could readily be arranged for either 110-volt operation or 220-volt operation, according to the requirements of the purchaser of the equipment.

The particular refrigerating unit illustrated in Fig. 1 comprises a main motor 1, adapted to drive a compressor (not shown) of the refrigerating equipment, and a small auxiliary fan-motor 2, adapted to drive a fan (not shown) for air-cooling the refrigerating equipment.

The main motor 1 comprises a squirrel-cage rotor-member 3, two main primary windings 4 and 5, and a dephased auxiliary or starting winding 6, the latter being connected in shunt to the main winding 5, through a serially connected auto-transformer 7 which is connected in series with the auxiliary winding 6, the two elements 6 and 7 being connected in shunt to the main winding 5. The auto-transformer 7 is utilized as a means for providing a high voltage which is applied to a capacitor 8 which causes the motor 1 to start and run as a capacitor-motor. The capacitor 8 is thus a serially related part of the circuit of the auxiliary winding 6, and gives said circuit an impedance-characteristic such as to cause the current in the auxiliary winding 6 to be dephased with respect to the current in the main windings 4 and 5.

The fan-motor 2 has a squirrel-cage rotor-member 9, a main winding 10 and an auxiliary winding 11, the main and auxiliary windings 10 and 11 being permanently connected in parallel with the main and auxiliary windings 5 and 6 of the main motor 1.

In order that the aggregate shown in Fig. 1 may be adapted for operation on either 110 volts or 220 volts, separate terminal connections A and B are provided for the main winding 4, and other terminal connections C and D are brought out for the other main winding 5, and a terminal board is arranged, as symbolized by a double-throw switch 13, whereby the main windings 4 and 5 may be connected either in series, for 220- volt operation, or in parallel for 110-volt operation, as shown, according to the voltage of the supply-line 14—15.

The starting and stopping of the refrigerating unit shown in Fig. 1 is under the control of a thermostat or low-pressure control-device 16, which is illustrated symbolically as a simple switch. When this switch closes, the aggregate must start up by itself, and when the switch 16 opens, the aggregate must cease operating.

There are three automatic controlling or safety features associated with the unit shown in Fig. 1, and these must all be arranged so that they operate satisfactorily on both the low-voltage and the high-voltage connections of the unit. The three devices just mentioned are a thermal over-current relay 20, an unloader device 21, and a speed-responsive undercurrent relay 22.

The thermal overcurrent relay 20 comprises a normally closed thermally responsive contact-device 23, connected in series with the supply-lead 14, and a small heater 24 connected in series with the main winding 4 and disposed in thermal relation to the thermally responsive contact-device 23. The object of this thermal overcurrent relay is to serve the function of a fuse or other circuit-interrupter for disconnecting the motor in case it should become overloaded or short circuited.

The current-responsive device which is indicated symbolically at 21, and which is designated in Fig. 1 as an unloader-device, is utilized in connection with the refrigerating unit for bypassing the compressor (not shown), so as to reduce the load on the main motor 1 during the starting period. The unloader is connected in series with the main winding 4, and, during the initial starting period, is energized with a sufficient in-rush of current to cause the operation of said unloader 21, whereas, when the motor approaches its full speed, the current subsides to a value which permits the unloader to return to its inoperative position. This current-responsive device 21 may be regarded as symbolic of any current-responsive device which is utilized for any purpose whatsoever.

The undercurrent relay 22, shown in Fig. 1, is also connected in series with the main motor-winding 4. This relay is utilized as a speed-responsive device for responding indirectly to the speed of the main motor, because the starting-current reduces in value as the motor picks up speed, during the starting operation. When the undercurrent relay 22 picks up, upon the initial in-rush of starting current, it changes the taps on the series auto-transformer 7 so as to have a relatively small number of turns in the primary winding, thereby increasing the voltage applied to the capacitor 8, and providing the equivalent of a large capacitance for starting. During normal running conditions, a smaller effective value of capacitance is desired, and this is obtained by causing the setting of the undercurrent relay 22 to be such that at a suitable point in the starting-operation of the main motor 1, as at half-speed, or any other desired percentage of normal speed, the undercurrent relay 22 drops out and increases the number of primary turns on the series auto-transformer 7, as indicated.

It will be observed that our current-responsive devices 20, 21 and 22 are all connected so as to be responsive to a current which is approximately the same regardless of whether the motor is connected for 110-volt operation or for 220-volt operation, said current being, in this case, the current flowing in the main winding 4, although any other current, which does not materially change with the position of the double-throw switch 13, may be utilized. It will be understood that the current in each of the main windings 4 and 5 of our motor is substantially the same, whether those windings are connected in parallel for 110-volt operation, or in series for 220-volt operation.

It will be further observed that we have utilized two auxiliary circuits which are dependent upon the voltage appearing across the terminals of either one of the main windings, such as the main winding 5 in the particular case of Fig. 1. These voltage-responsive circuits are the auxiliary-winding circuit consisting of the auxiliary winding 6 and its serially connected capacitor 8, and the main winding 10 of the fan-motor 2. Since the voltage appearing across the main-winding 5 is substantially 110 volts, regardless of whether the 110-volt connection or the 220-volt connection is utilized, it will thus be seen that we have provided an aggregate or unit in which it is not necessary to change the voltage of the auxiliary circuits 6—7—8 and 10, the only change necessary being the change from the parallel to the series connection of the two main windings 4 and 5.

As has been intimated, the precise connections shown in Fig. 1 need not be followed exactly, as the current-responsive devices 20, 21 and 22 may be energized in response to any currents which are substantially unaffected by the terminal-voltage connections, and the voltage-responsive auxiliary circuits may be connected across either one of the two main windings 4 or 5.

In the particular apparatus shown in Fig. 2, for example, the fan-motor 2 has been omitted, and the unloader 21' has been connected in a circuit which is responsive to the combined currents of the main winding 5 and the auxiliary winding 6, being connected in the circuit which extends, from the junction-point 30 of these two windings, to the supply-lead 15 which is connected to the terminal-connector D of the terminal board. Whenever we refer to a response to the current in one of the main windings 4 or 5, in this specification or in the appended claims, we mean, by such reference, to include the unloader-21' connection in Fig. 2.

The subject-matter of Figs. 1 and 2 is claimed more particularly in our divisional application Serial No. 243,384, filed December 1, 1938, for Dual-voltage apparatus.

In Fig. 3, we show our invention in a form of embodiment utilizing two main motors 1 and 1', which are arranged for sequential operation, so that the motor 1 will start first, and when it has reached a predetermined speed, the second motor 1' will be energized.

In Fig. 3, the motor 1 is energized in a manner similar to Fig. 1, except that the thermostat or low-pressure control-device 16a is not arranged in series with a supply-load for the motor, but is arranged in a control-circuit for an electromagnetic contactor-switch 32 which is provided with two make-contacts 33 and 34 for energizing motors 1 and 1', respectively. It will be noted that only one thermostat 16a is utilized for controlling both motors 1 and 1'.

The apparatus shown in Fig. 3 utilizes two thermal overcurrent relays 20 and 20', one for each of the motors 1 and 1'. These protective relays are connected in a manner similar to that shown and described for Fig. 1, except that the thermally responsive contact-elements 23a are not connected in the supply-leads for the motors, but only in the control-circuit for the electromagnetic contactor 32, thereby transferring the heavy-current interrupting-duty to the contact-elements 33 and 34 of the contactor. In the particular apparatus shown in Fig. 3, the operation of either thermal overload contact 23a stops both the motors.

In the apparatus shown in Fig. 3, a special speed-responsive contact 36 is associated with the first motor 1, being normally latched in open position by a latch 37 which is tripped after a delay which is initiated and terminated respectively by the energization and subsequent partial deenergization of a coil 38. Any suitable means may be utilized to bring about this trip-latch operation. In Fig. 3, by way of illustration, the coil 38 is shown as pulling the latch 37 toward latching position against the bias of a spring 39; and movable contact-element 36 is biased toward closed position by a spring 41; the electromagnetic contactor 32 is provided with a follow-up movement after making its contacts 33 and 34 (as indicated schematically by sliding contact-members), and is provided with a plunger-pin 43 which passes through a notch or perforation 44 in the movable contact-element 36, so that its tip end 45 abuts a stiff leaf-spring 46 carried by the latch 37, so that the final opening-movement of the contactor 32 passes the latch 37 closed against its biasing spring 39; and the contactor-pin 43 also carries a shoulder 48 which abuts the movable contact-element 36 and latches it open during the final opening-movement of the contactor 32.

The tripping coil 38 is energized in series with the main winding 4 and relay-coil 22 of the first motor 1.

When the thermostat-switch 16a closes, in Fig. 3, the contactor-coils 40 and 41 are energized, closing the contactor 32. Before the contactor-pin 43 moves, in its closing movement, far enough to permit the biasing spring 39 to unlatch the latch 37, the contactor-contacts 33 are closed, thereby energizing the first motor 1 and causing a current-inrush sufficient to enable the series coil 38 to hold the latch 37 closed. The contactor then completes its closing-movement, disengaging its pin 45 from the latch-spring 46, and leaving the latch under the control of the coil 38, opposed by the spring 39. These forces are so adjusted that, at some convenient time during the starting-period of the first motor 1, and before the motor attains full speed, the starting current falls off sufficiently to permit the spring 39 to overpower the coil 38 and release the latch. It is this condition to which we refer as the partial deenergization of the coil 38, meaning a reduction in its energization sufficient to enable the spring 39 to operate. This causes the movable contact-element 36 to close, under the action of its spring 41, thereby energizing the second motor 1', which thereupon begins to start and goes through the operations which will be understood from the description of Fig. 1.

The terminal board, in Fig. 3, is provided with twelve terminal-connections A to M, for changing over, from 110-volt operation to 220-volt operation, the change-over being effected by suitable links or jumpers, or, as symbolically illustrated, by means of a 6-pole double-throw switch 13a. The terminals A, B, C and D are for the first motor 1, and correspond to the correspondingly lettered terminals already described in connection with Fig. 1. The terminals E, F, G and H are the corresponding terminals for the second motor 1'. The terminals J, K, L and M are the terminals of the two operating coils 40 and 41 of the electromagnetic contactor 32, and these terminals are utilized for the purpose of changing these operating coils from parallel connection, which they have for 110-volt operation, to series connection for 220-volt operation. In this manner, the rating of the contactor 32 is changed from 110 volts to 220 volts at the same time that the rating of the main motors 1 and 1' are changed.

Except for the differentiating features which have already been described, the operation of the Fig. 3 apparatus is the same as that which has been described in connection with Fig. 1, and no further explanation is believed to be necessary.

While we have described our invention in several exemplary forms of embodiment, we wish it to be distinctly understood that the illustrated forms are only by way of example and not by way of limitation, as it will be obvious that those skilled in the art can adopt many variations in the precise forms of embodiment of our invention without departing from its essential features, particularly in its broader aspects. We desire, therefore, that the appended claims shall be accorded the broadest interpretation consistent with their language and the prior art.

We claim as our invention:

1. A sequential switching apparatus comprising a main switch-member, an auxiliary contact-member, a latch-mechanism for normally latching said auxiliary contact-member in open position, said latch-mechanism including normally functioning holding-means for normally holding said auxiliary contact-member in its latched open position, an auxiliary coil operatively associated with said auxiliary contact-member, means operative upon an actuation of the main switch-member to transfer the holding-function from said normally functioning holding-means to said coil, means including said coil for unlatching said latch-mechanism after a delay which is initiated and terminated respectively in response to the energization and subsequent partial deenergization of said coil, means for thereupon causing said auxiliary contact-member to close, means for energizing said coil when the main switch-member is closed, means for partially deenergizing said coil, and means for resetting said auxiliary contact-member to normally latched open position when the main switch-member is opened.

2. In combination, a first electrical load-device having high current-inrush characteristics, a second electrical load-device, and a sequential switching apparatus therefor, said switching apparatus comprising a main switch-member, an auxiliary contact-member for energizing the second load device after the subsidence of the first current-inrush of the first load-device, a latch-mechanism for normally latching said auxiliary contact-member in open position, said latch-mechanism including normally functioning holding-means for normally holding said auxiliary contact-member in its latched open position, an auxiliary coil operatively associated with said auxiliary contact-member, means operative upon an actuation of the main switch-member to transfer the holding-function from said normally functioning holding-means to said coil, means including said coil for unlatching said latch-mechanism after a delay which is initiated and terminated respectively in response to the energization and subsequent partial deenergization of said coil, means for thereupon causing said auxiliary contact-member to close, means for energizing said coil in series circuit relation to said first load-device, and means for resetting said auxiliary contact-member to normally latched open position when the main switch-member is opened.

3. A sequential switching apparatus comprising a main switch-member, an auxiliary contact-member, a latch-mechanism for normally latching said auxiliary contact-member in open position, said latch-mechanism including normally functioning holding-means for normally holding said auxiliary contact-member in its latched open position, an auxiliary coil operatively associated with said auxiliary contact-member, means operative upon an actuation of the main switch-member to transfer the holding-function from said normally functioning holding-means to said coil, means including said coil for unlatching said latch-mechanism after a delay which is initiated and terminated respectively in response to the energization and subsequent partial deenergization of said coil, means for thereupon causing said auxiliary contact-member to close, means for energizing said coil in series with a contact of said main switch-member, and means for resetting said auxiliary contact-member to normally latched open position when the main switch-member is opened.

4. In combination, a first electrical load-device having high current-inrush characteristics, a second electrical load-device, and a sequential switching apparatus therefor, said switching apparatus comprising a main switch-member, an auxiliary contact-member for energizing the second load-device after the subsidence of the first current-inrush of the first load-device, a latch-mechanism for normally latching said auxiliary contact-member in open position, said latch-mechanism including normally functioning holding-means for normally holding said auxiliary contact-member in its latched open position, an auxiliary coil operatively associated with said auxiliary contact-member, means operative upon an actuation of the main switch-member to transfer the holding-function from said normally functioning holding-means to said coil, means including said coil for unlatching said latch-mechanism after a delay which is initiated and terminated respectively in response to the initiation and the termination of the effectual energization of said coil, means for thereupon causing said auxiliary contact-member to close, means for initiating the effectual energization of said coil in response to the closure of the main switch-member, means for discontinuing the effective energization of said coil in response to the subsidence of said first current-inrush, and means for resetting said auxiliary contact-member to normally latched open position when the main switch-member is opened.

EUGENE W. SCOTT.
ROBERT H. TULL.